United States Patent [19]
Henderson

[11] Patent Number: 5,325,576
[45] Date of Patent: Jul. 5, 1994

[54] PROCESS AND APPARATUS FOR DISASSEMBLING PLANKS FROM A TRUCK BED

[76] Inventor: Lawrence Henderson, 101 Henderson Dr., Clemson, S.C. 29631

[21] Appl. No.: 41,401

[22] Filed: Mar. 31, 1993

[51] Int. Cl.⁵ .............................................. B23P 19/04
[52] U.S. Cl. ..................... 29/426.5; 29/252; 254/17
[58] Field of Search ............... 29/244, 252, 402.03, 29/426.5, 267; 414/664, 668, 672, 785; 254/11, 17

[56] References Cited

U.S. PATENT DOCUMENTS

| | | | |
|---|---|---|---|
| 3,869,783 | 3/1975 | Spencer | 29/252 X |
| 3,875,643 | 4/1975 | Cramer | 29/252 |
| 4,069,932 | 1/1978 | Stedman | 414/664 |
| 4,112,578 | 9/1978 | Sanford | 29/252 X |
| 4,332,203 | 6/1982 | Flowers | 105/422 |
| 4,413,708 | 11/1983 | Stedman | 414/664 X |
| 4,433,464 | 2/1984 | Herbert | 29/252 |
| 4,653,168 | 3/1987 | Herbert | 29/426.5 |

Primary Examiner—Mark Rosenbaum
Assistant Examiner—S. Thomas Hughes
Attorney, Agent, or Firm—Hardaway Law Firm

[57] ABSTRACT

A novel process and apparatus for removing planks from a truck bed which has a vertical body having a top and a bottom portion, a pulling member pivotally attached to the bottom portion for pulling planks, and a hydraulic lift for lifting the pulling member toward the top portion of the vertical body wherein the hydraulic lift is pivotally attached to the pulling member.

15 Claims, 2 Drawing Sheets

PROCESS AND APPARATUS FOR DISASSEMBLING PLANKS FROM A TRUCK BED

BACKGROUND OF THE INVENTION

This invention relates generally to the art of devices for the removal of boards, and more particularly to such devices especially adapted for the removal of board planks held by support beams from the bed of a truck.

U.S. Pat. No. 4,332,203 discloses a ram means for flooring a railroad car wherein a plank is forced downwards and sidewards so that the plank can be easily and quickly tied to a support member.

In light of the prior art, there exists much room for improvement in the art for devices directed to removing planks held by support beams.

SUMMARY OF THE INVENTION

It is therefore an object of the present invention to provide a novel apparatus and process for removing planks held by support beams.

It is another object of the present invention to provide a novel apparatus and process for removing planks held by support beams from a truck bed which can easily and accurately remove such planks.

These as well as other objects are accomplished by an apparatus for removing planks held by support beams comprising a vertical body having a top and bottom portion, a pulling member, preferably comprising opposing blades, for pulling planks pivotally attached to the bottom portion of the vertical body, and lifting means for lifting the pulling means toward the top portion of the vertical body to thereby remove the planks.

DETAILED DESCRIPTION

In accordance with this invention it has been found that a novel apparatus and process for removing planks held by support means can be provided. It has also been found in accordance with this invention that the apparatus and process for removing planks held by support means from a truck bed is effective and easy to use. Various other advantages and features will become apparent from the following description given with reference to the various figures of drawings.

Figure 1:
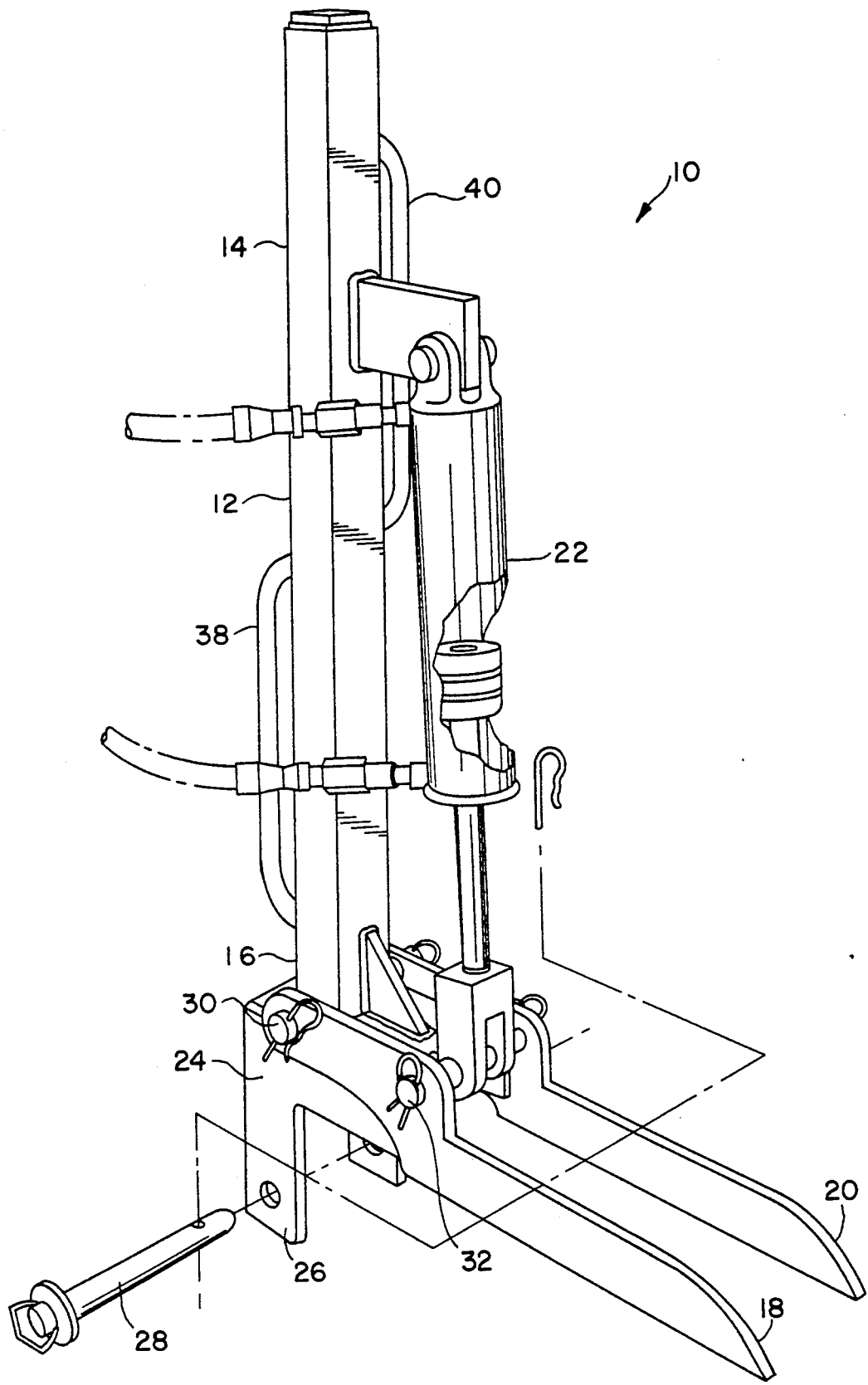
FIG. 1 of the drawings is a perspective view illustrating a preferred embodiment of the apparatus for removing planks.

FIG. 1 of the drawings is a perspective view illustrating a preferred embodiment of the apparatus 10 for removing planks. Apparatus 10 is illustrated as comprising a vertical body 12 having a top and bottom portion, designated as 14 and 16 respectively. Pivotally attached to bottom portion 16 of vertical body 12 is a pulling member for pulling planks, illustrated in FIG. 1 in the preferred embodiment as a pair of spaced-apart blades 18 and 20. Apparatus 10 further comprises a lifting means for lifting blades 18 and 20 toward top portion 14 of vertical body 12. This lifting means is illustrated in FIG. 1 in the preferred embodiment as hydraulic lifting means 22 that is attached to top portion 14 and pivotally attached to blades 18 and 20. Hydraulic lifting means 22 preferably comprises hydraulic lifting means of any construction and operation known to those of skill in the art.

In order to firmly secure apparatus 10 in a position for removing planks from the bottom of a truck bed, vertical body 12 terminates in an anchor means for anchoring vertical body 12 to a support beam holding planks to be pulled. This anchor means is partially illustrated in FIG. 1 in the preferred embodiment as comprising a sleeve 24 which includes extended portions 26 that define holes therein for insertion of a pin 28. To securely position apparatus 10, pin 28 extends through and between portions of the anchor means passing beneath a beam supporting planks. This preferred embodiment of the anchor means of apparatus 10 is more precisely illustrated in position in FIG. 2 of the drawings.

As illustrated in FIG. 1, spaced-apart blades 18 and 20 are pivotally attached to opposing sides of bottom portion 16 adjacent to sleeve 24 of the anchor means. From the place of pivotal attachment by pin 30, blades 18 and 20 extend away from vertical body 12 and generally perpendicular to vertical body 12. Approximate bottom portion 16 of vertical body 12, blades 18 and 20 are movably connected by pin 32, to which hydraulic lifting means 22 is pivotally connected between blades 18 and 20. Like pins 28 and 30, pin 32 is slidably and rotably secured in position by locking pins. Extending from this point, blades 18 and 20 extend slightly downward before extending again perpendicular to vertical body 12. This overall configuration of spaced-apart blades 18 and 20 enables apparatus 10 to be securely positioned on a beam supporting planks wherein blades 18 and 20 straddle the beam and wherein blades 18 and 20 can extend underneath planks to be removed. The connection of hydraulic lifting means 22 with blades 18 and 20 also enables operation of hydraulic lifting means 22 to simultaneously lift blades 18 and 20 towards top portion 14 in order to apply equal pressure to planks to be removed.

Figure 2:
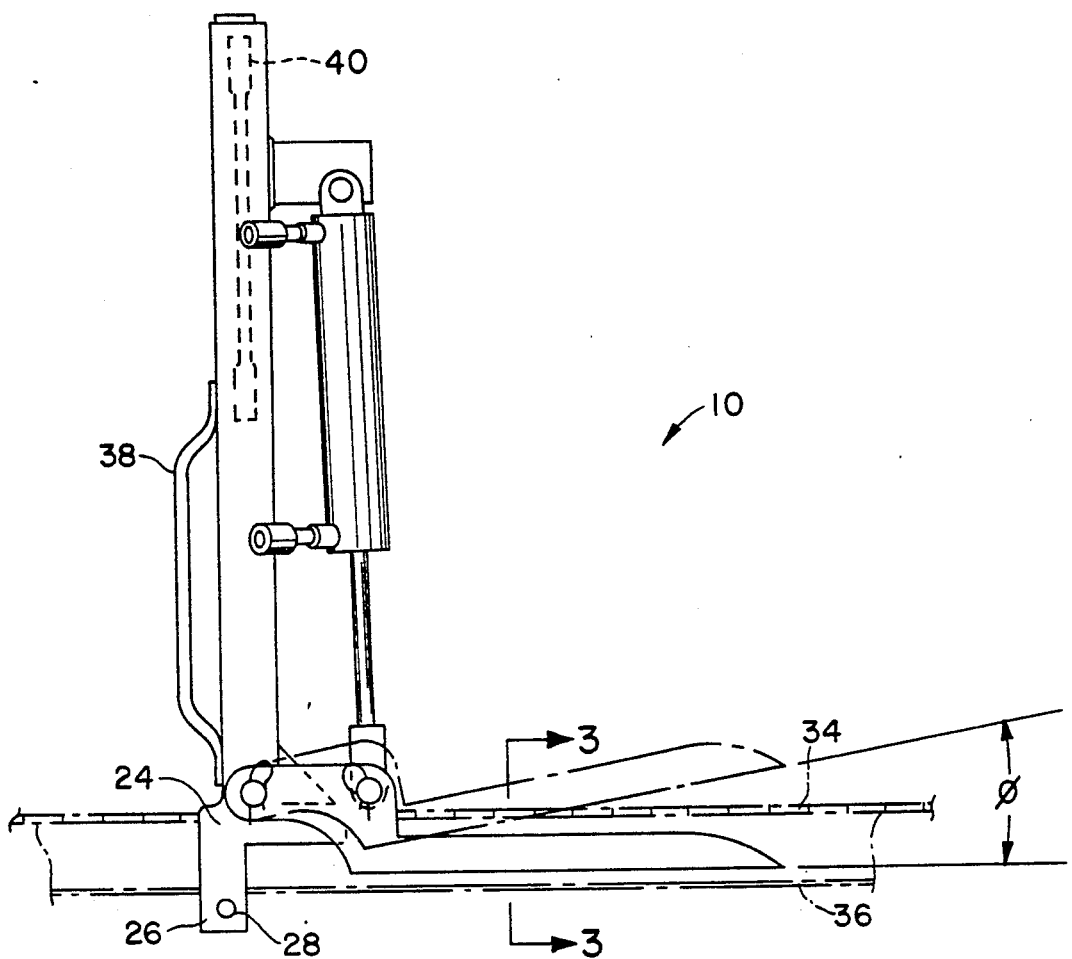
FIG. 2 of the drawings is a side elevation view illustrating the apparatus for removing planks positioned to remove planks.

FIG. 2 of the drawings is a side elevation view illustrating apparatus 10 in position for removing planks 34. By use of sleeve 24, extended portions 26 and pin 28, apparatus 10 is securely attached to beam 36 which supports planks 34 thereon. Sleeve 24, extended portion 26, and blades 18 and 20 all straddle beam 36 while in position for and during removal of planks 34, although only blade 18 is visible in FIG. 2. Handles 38 and 40, also illustrated in FIG. 1 of the drawings, enable a user of apparatus 10 to control the position of vertical body 12 while secured to beam 36 during removal of planks 34.

As illustrated in FIG. 2 of the drawings, hydraulic lifting means 22 causes blades 18 and 20 to lift towards top portion 14 of vertical body 12. Blades 18 and 20 are lifted simultaneously to pull planks 34 from beam 36, and blades 18 and 20, as illustrated in phantom in FIG. 2, preferably are raised at an angle theta.

Figure 3:
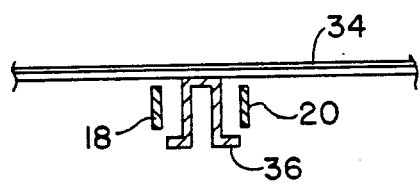
FIG. 3 of the drawings is a cross section view drawn along line 3—3 of FIG. 2.

FIG. 3 of the drawings is a cross section view drawn along line 3—3 of FIG. 2. Blades 18 and 20 are illustrated in the preferred embodiment as straddling beam 36 in position to remove planks 34. The structure of beams 18 and 20 enable apparatus 10, illustrated in FIGS. 1 and 2, to be securely positioned on beam 36 while blades 18 and 20 extend a distance from and perpendicular to vertical body 12 in a position directly beneath planks 34 yet to be removed.

The process of removing planks 34 supported by beam 36 from the bottom of a truck bed thus is quite simple in procedure. First, apparatus 10 must be securely positioned to beam 36 by use of the anchor means, illustrated in FIG. 1 and 2 of the drawings as comprising sleeve 24 including extended portions 26. Pin 32 is then inserted through holes defined by extended portions 26 to extend through and between the extended portions and beneath beam 36. In positioning apparatus 10 to beam 36, blades 18 and 20 must be inserted underneath planks 34 in a position ready to remove the planks. To initially place apparatus 10 in its straddling position over a beam supporting planks in the bed of a truck, it frequently will be necessary to first remove an area of the planks sufficient for insertion of blades 18 and 20 and the anchor means of apparatus 10. This initial section can be removed by any conventional means so long as the portion removed is sufficient to allow proper positioning of apparatus 10 with blades 18 and 20 straddling a beam below the planks and extending directly beneath the planks. Once securely positioned, the hydraulic lifting means can be activated to forcefully and simultaneously lift the blades, thereby removing the planks. Apparatus 10 can then be slid along the beam to again position the blades directly beneath planks to be removed. Frequently, apparatus 10 can be slid along the beam without having to unanchor the apparatus. In this manner, planks can be removed progressively, insuring quick as well as accurate removal of the planks.

It is thus seen that in accordance with this invention a novel apparatus and process for removing planks held by support beams is provided. It is further seen that the apparatus and process for removing planks held by support beams from a truck bed which can easily and accurately remove such planks. Other modifications will become apparent to those of skill in the art from a reading of the above description, and such modifications are embodied within the spirit and scope of this invention as measured by the following appended claims.

That which is claimed:

1. An apparatus for removing planks held by support beams comprising:
   a vertical body having a top and a bottom portion;
   a pulling member for pulling planks, said pulling member pivotally attached at a point of attachment directly to said bottom portion of said vertical body wherein pivotal movement of said pulling member is allowed;
   lifting means for lifting said pulling member toward said top portion of said vertical body, said lifting means pivotally attached to said pulling member;
   whereby activating said lifting means lifts said pulling member in an angular fashion toward the top of said vertical body while pivoting on said point of attachment.

2. The apparatus according to claim 1 wherein said bottom portion of said vertical body terminates in an anchor means for anchoring said vertical body to a support beam holding planks.

3. The apparatus according to claim 2 wherein said anchor means comprises a sleeve for straddling said support beam.

4. The apparatus according to claim 3 wherein said sleeve includes fastening means for securing said sleeve to said support beam.

5. The apparatus according to claim 4 wherein said fastening means comprises a pin secured through and between holes defined through said sleeve.

6. The apparatus according to claim 1 wherein said pulling member comprises a pair of spaced-apart blades for straddling said support beam.

7. The apparatus according to claim 6 wherein each of said spaced-apart blades is pivotally attached to opposing sides of said bottom portion of said vertical body.

8. The apparatus according to claim 1 wherein said lifting means is pivotally attached to said pulling member adjacent said bottom portion of said vertical body.

9. The apparatus according to claim 6 wherein said spaced-apart blades extend away from said bottom portion of said vertical body generally perpendicular to said vertical body and said lifting means is pivotally attached to said spaced-apart blades proximate said bottom portion of said vertical body.

10. The apparatus according to claim 1 wherein said lifting means is hydraulic.

11. An apparatus for removing planks held by support beams from a truck bed comprising:
    a vertical body having a top and a bottom portion, said bottom portion terminating in an anchor means for securing said vertical body to one of said support beams;
    a pair of spaced-apart blades pivotally attached directly to opposing sides of said bottom portion of said vertical body, said blades attached to said vertical body by a connecting bolt proximate said bottom portion of said vertical body;
    lifting means for lifting said blades, said lifting means pivotally attached to said spaced-apart blades;
    whereby activating said lifting means forcefully and simultaneously lifts said blades in an angular fashion.

12. The apparatus according to claim 11 wherein said lifting means is hydraulic.

13. A process for removing planks held by support beams from a truck bed comprising the steps of:
    providing an apparatus comprising:
      a vertical body having a top and bottom portion said bottom portion terminating in an anchor means for securing said vertical body to one of said support beams;
      a pair of spaced-apart blades pivotally attached to opposing sides of said bottom portion of said vertical body, said blades connected by a connecting bolt proximate said bottom portion of said vertical body;
      lifting means for lifting said blades, said lifting means pivotally attached to said pair of spaced-apart blades and to said top portion of said vertical body;
    securely anchoring said vertical body to one of said support beams with said blades straddling said support beam and positioned below said planks; and
    activating said lifting means thereby forcefully and simultaneously lifting said blades and removing said planks.

14. The process according to claim 13 further including the steps of re-positioning said apparatus and reactivating said lifting means thereby forcefully and simultaneously lifting said blades and removing additional planks.

15. The process according to claim 13 further including the step of removing a portion of planks prior to anchoring said vertical body.

* * * * *